(12) United States Patent
Shavit et al.

(10) Patent No.: US 7,539,849 B1
(45) Date of Patent: May 26, 2009

(54) MAINTAINING A DOUBLE-ENDED QUEUE IN A CONTIGUOUS ARRAY WITH CONCURRENT NON-BLOCKING INSERT AND REMOVE OPERATIONS USING A DOUBLE COMPARE-AND-SWAP PRIMITIVE

(75) Inventors: Nir N. Shavit, Cambridge, MA (US); Ole Agesen, Needham, MA (US); David L. Detlefs, Westford, MA (US); Christine H. Flood, Westford, MA (US); Alexander T. Garthwaite, Beverly, MA (US); Paul A. Martin, Arlington, MA (US); Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/547,288

(22) Filed: Apr. 11, 2000

Related U.S. Application Data

(60) Provisional application No. 60/177,089, filed on Jan. 20, 2000.

(51) Int. Cl.
*G06F 7/06* (2006.01)
(52) U.S. Cl. ...................... 712/202; 707/101
(58) Field of Classification Search ................ 712/202, 712/209; 719/312, 314, 315
See application file for complete search history.

(56) References Cited

U.S. PATENT DOCUMENTS

| 3,686,641 | A | | 8/1972 | Logan et al. | |
|---|---|---|---|---|---|
| 3,886,525 | A | * | 5/1975 | Brown et al. | 711/147 |
| 4,584,640 | A | * | 4/1986 | MacGregor et al. | 707/200 |
| 5,081,572 | A | * | 1/1992 | Arnold | 711/163 |
| 5,710,925 | A | * | 1/1998 | Leach et al. | 719/316 |
| 5,745,764 | A | * | 4/1998 | Leach et al. | 719/316 |
| 5,797,005 | A | | 8/1998 | Bahls et al. | |
| 5,805,885 | A | * | 9/1998 | Leach et al. | 719/316 |
| 6,128,710 | A | * | 10/2000 | Greenspan et al. | 711/152 |
| 6,223,335 | B1 | * | 4/2001 | Cartwright et al. | 717/100 |

(Continued)

FOREIGN PATENT DOCUMENTS

EP          0 366 585 A       5/1990

(Continued)

OTHER PUBLICATIONS

Weiss, Mark Allen. Data Structures & Algorithm Analysis in C++. Second Edition. Reading, Mass.: Addison-Wesley, © 1999. Chapter 3.*

(Continued)

*Primary Examiner*—Aimee J Li
(74) *Attorney, Agent, or Firm*—Osha • Liang LLP

(57) ABSTRACT

An array-based concurrent shared object implementation has been developed that provides non-blocking and linearizable access to the concurrent shared object. In an application of the underlying techniques to a deque, the array-based algorithm allows uninterrupted concurrent access to both ends of the deque, while returning appropriate exceptions in the boundary cases when the deque is empty or full. An interesting characteristic of the concurrent deque implementation is that a processor can detect these boundary cases, e.g., determine whether the array is empty or full, without checking the relative locations of the two end pointers in an atomic operation.

39 Claims, 5 Drawing Sheets

U.S. PATENT DOCUMENTS

| | | | |
|---|---|---|---|
| 6,240,465 B1 * | 5/2001 | Leach et al. | 719/316 |
| 6,243,764 B1 * | 6/2001 | Leach et al. | 719/316 |
| 6,247,064 B1 | 6/2001 | Alferness et al. | |
| 6,360,219 B1 | 3/2002 | Bretl et al. | |
| 6,374,339 B2 | 4/2002 | Iivonen | |

FOREIGN PATENT DOCUMENTS

| | | |
|---|---|---|
| EP | 0 466 339 A2 | 1/1992 |
| WO | WO 86 00434 A | 1/1986 |

OTHER PUBLICATIONS

Comer, Douglas. Operating System Design: The Xinu Approach. Englewood Cliffs, NJ: Prentice-Hall, Inc. © 1984. Chapter 3.*

Hennessy, John L. and Patterson, David A. Computer Architecture: A Quantitative Approach. Second Edition. San Francisco, CA: Morgan Kaufman Publishers, Inc. © 1996. pp. 485-495 and 562-572.*

Cohoon, James P. and Davidson, Jack W. C++ Program Design: An Introduction to Programming and Object-Oriented Design. Second Edition. New York: WCB/McGraw-Hill © 1999. pp. 465-502.*

Stroustrup, Bjarne. The C++ Programming Language. Third Edition. Reading, Mass.: Addison-Wesley © 1997. pp. 461-497.*

Stone, Janice M. "A simple and correct shared-queue algorithm using Compare-and-Swap". IEEE © 1990. pp. 495-504.*

Michael, Maged M. and Scott, Michael L. "Simple, Fast, and Practical Non-Blocking and Blocking Concurrent Queue Algorithms" © 1996.*

Kruse, Robert L.; Leung, Bruce P.; and Tondo, Clovis L. "Data Structures and Program Design in C". Englewood Cliffs, NJ: Prentice-Hall, Inc., © 1993. pp. 69-75.*

Weiss, Mark Allen. "Data Structures & Algorithm Analysis in C++". Second Edition. Reading, Massachusetts: Addison Wesley Longman, Inc., © 1999. Pages 118 and 492.*

Henry Massalin, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 1992; pp. 1-149 XP002172093 [retrieved from the Internet on Jul. 13, 2001: URL: ftp://ftp.cs.columbia.edu/reports/reports-1992/cucs-039-92.ps.gz].

Y. Afek, M. Merritt, G. Taubenfeld, and D. Touitou. "Disentangling Multi-Object Operations," *Proceedings of the 16th Annual ACM Symposium on Principles of Distributed Computing*, pp. 111-120, Aug. 1997. Santa Barbara, CA.

N. S. Arora, Blumofe, and C. G. Plaxton. "Thread Scheduling For Multiprogrammed Multiprocessors," *Proceedings of the 10th Annual ACM Symposium on Parallel Algorithms and Architectures*, 1998.

H. Attiya and E. Dagan. "Universal Operations: Unary versus Binary," *Proceedings of the 15th Annual ACM Symposium on Principles of Distributed Computing*, 11 pages, May 23-26, 1996. Phila. PA.

Hagit Attiya, Nancy Lynch, and Nir Shavit. "Are Wait-Free Algorithms Fast?" *Journal of the ACM*, 41(4):725-763, pp. 223-232, Jul. 1994.

Hagit Attiya and Ophir Rachman. "Atomic Snapshots In $O(n \log n)$ Operations," *SIAM Journal on Computing*, 27(2):319-340, pp. 1-42, Mar. 1998.

G. Barnes. "A Method For Implementing Lock-Free Shared Data Structures," *Proceedings of the 5th ACM Symposium on Parallel Algorithms and Architectures*, pp. 261-270, Jun. 1993.

B. N. Bershad. "Practical Considerations For Non-Blocking Concurrent Objects," *Proceedings 13th IEEE International Conference on Distributed Computing Systems*, pp. 264-273. IEEE Computer Society Press, May 25-28, 1993. Los Alamitos CA.

M. Greenwald. "Non-Blocking Synchronization and System Design," PhD thesis, Standorf University Technical Report STAN-CS-TR-99-1624, 241 pages, Palo Alto, CA, Aug. 1999.

M. B. Greenwald and D. R. Cheriton. "The Synergy Between Non-Blocking Synchronization And Operating System Structure," *2nd Symposium on Operating Systems Design and Implementation*, pp. 123-136, Oct. 28-31, 1996. Seattle, WA.

M. Herlihy. "A Methodology For Implementing Highly Concurrent Data Objects," *ACM Transactions on Programming Languages and Systems*, 15(5):745-770, Nov. 1993.

M. Herlihy and J. Moss. "Transactional memory: Architectural Support For Lock-Free Data Structures," *Technical Report CRL 92/07*, Digital Equipment Corporation, 12 pages, Cambridge Research Lab, 1992.

M.P. Herlihy. "Wait-Free Synchronization," *ACM Transactions On Programming Languages and Systems*, 13(1):124-149, Jan. 1991.

M. P. Herlihy and J.M. Wing. "Linearizability: A Correctness Condition For Con-Current Objects," *ACM Transactions On Programming Languages and Systems*, 12(3):463-492, Jul. 1990.

D. E. Knuth. "The Art of Computer Programming: Fundamental Algorithms," Addison-Wesley, 2nd edition, 3 pages, 1968.

A. LaMarca. "A performance evaluation of lock-free synchronization protocols," *Proceedings of the 13th Annual ACM Symposium on Principles of Distributed Computing*, pp. 130-140, Aug. 14-17 1994. Los Angeles, CA.

H. Massalin and C. Pu. "A Lock-Free Multiprocessor OS Kernel," *Technical Report TR CUCS-005-9*, pp. 1-19, Columbia University, New York, NY, 1991.

N. Shavit and D. Touitou. "Software Transactional Memory," *Distributed Computing*, 10(2):99-116, Feb. 1997.

Agesen, Ole, et al.: "*DCAS-Based Concurrent Deques*,"12th Annual ACM Symposium on Parallel Algorithms and Architectures, Jul. 9-12, 2000.

Blumofe, Robert D. et al., "Verification of a Concurrent Deque Implementation", University of Texas at Austin, Department of Computer Sciences, Technical Report TR99-11, Jun. 1999.

Chuang, Tyng-Ruey et al., "*Real-Time Deques, Multihead Turing Machines, and Purley Functional Programming*", ACM, Jun. 1993.

Farook, Mohammad et al., "*Managing Long Linked Lists Using Lock Free Techniques*", University of Manitoba, Canada, 1998.

Michael, Maged M. et al., "*Simple, Fast, and Practical Non-Blocking and Blocking Concurrent Queue Algorithms*", University of Rochester, Department of Computer Science, 1996.

Prakash, Sundeep et al.; "*Non-Blocking Algorithms for Concurrent Data Structures*", University of Florida, Jul. 1, 1991.

Prakash, Sundeep et al., "*A Nonblocking Algorithm for Shared Queues Using Compare-and-Swap*", IEEE Transactions on Computers, vol. 43, No. 5, May 1994.

Shann, Chien-Hua et al., "*A Practical Nonblocking Queue Algorithm Using Compare-and Swap*", IEEE, Jul. 2000.

Turek, John et al., "*Locking Without Blocking: Making Lock Based Concurrent Data Structure Algorithms Nonblocking*", ACM, 1992.

Valois, John D., "*Lock-Free Linked Lists Using Compare-and-Swap*", ACM, 1995.

IBM Technical Disclosure Bulletin, "*Conditional Multiple Store Instruction*", Feb. 1, 1980.

* cited by examiner

MAINTAINING A DOUBLE-ENDED QUEUE IN A CONTIGUOUS ARRAY WITH CONCURRENT NON-BLOCKING INSERT AND REMOVE OPERATIONS USING A DOUBLE COMPARE-AND-SWAP PRIMITIVE

This application claims benefit of U.S. Provisional Application No. 60/177,089, filed Jan. 20, 2000, which is incorporated in its entirety herein by reference.

BACKGROUND OF THE INVENTION

1. Field of the Invention

The present invention relates to coordination amongst processors in a multiprocessor computer, and more particularly, to structures and techniques for facilitating non-blocking access to concurrent shared objects.

2. Description of the Related Art

Non-blocking algorithms can deliver significant performance benefits to parallel systems. However, there is a growing realization that existing synchronization operations on single memory locations, such as compare-and-swap (CAS), are not expressive enough to support design of efficient non-blocking algorithms. As a result, stronger synchronization operations are often desired. One candidate among such operations is a double-word compare-and-swap (DCAS). If DCAS operations become more generally supported in computers systems and, in some implementations, in hardware, a collection of efficient current data structure implementations based on the DCAS operation will be needed.

Massalin and Pu disclose a collection of DCAS-based concurrent algorithms. See e.g., H. Massalin and C. Pu, *A Lock-Free Multiprocessor OS Kernel*, Technical Report TR CUCS-005-9, Columbia University, New York, N.Y., 1991, pages 1-19. In particular, Massalin and Pu disclose a lock-free operating system kernel based on the DCAS operation offered by the Motorola 68040 processor, implementing structures such as stacks, FIFO-queues, and linked lists. Unfortunately, the disclosed algorithms are centralized in nature. In particular, the DCAS is used to control a memory location common to all operations, and therefore limits overall concurrency.

Greenwald discloses a collection of DCAS-based concurrent data structures that improve on those of Massalin and Pu. See e.g., M. Greenwald. *Non-Blocking Synchronization and System Design*, Ph.D. thesis, Stanford University Technical Report STAN-CS-TR-99-1624, Palo Alto, Calif., 8 1999, 241 pages. In particular, Greenwald discloses implementations of the DCAS operation in software and hardware and discloses two DCAS-based concurrent double-ended queue (deque) algorithms implemented using an array. Unfortunately, Greenwald's algorithms use DCAS in a restrictive way. The first, described in Greenwald, *Non-Blocking Synchronization and System Design*, at pages 196-197, used a two-word DCAS as if it were a three-word operation, storing two deque end pointers in the same memory word, and performing the DCAS operation on the two pointer word and a second word containing a value. Apart from the fact that Greenwald's algorithm limits applicability by cutting the index range to half a memory word, it also prevents concurrent access to the two ends of the deque. Greenwald's second algorithm, described in Greenwald, *Non-Blocking Synchronization and System Design*, at pages 217-220) assumes an array of unbounded size, and does not deal with classical array-based issues such as detection of when the deque is empty or full.

Arora et al. disclose a CAS-based deque with applications in job-stealing algorithms. See e.g., N. S. Arora, Blumofe, and C. G. Plaxton, *Thread Scheduling For Multiprogrammed Multiprocessors, in Proceedings of the* 10*th Annual ACM Symposium on Parallel Algorithms and Architectures,* 1998. Unfortunately, the disclosed non-blocking implementation restricts one end of the deque to access by only a single processor and restricts the other end to only pop operations.

Accordingly, improved techniques are desired that do not suffer from the above-described drawbacks of prior approaches.

SUMMARY

A set of structures and techniques are described herein whereby an exemplary concurrent shared object, namely a double-ended queue (deque), is provided. Although a described non-blocking, linearizable deque implementation exemplifies several advantages of realizations in accordance with the present invention, the present invention is not limited thereto. Indeed, based on the description herein and the claims that follow, persons of ordinary skill in the art will appreciate a variety of concurrent shared object implementations. For example, although the described deque implementation exemplifies support for concurrent push and pop operations at both ends thereof, other concurrent shared objects implementations in which concurrency requirements are less severe, such as LIFO or stack structures and FIFO or queue structures, may also be implemented using the techniques described herein.

Accordingly, a novel array-based concurrent shared object implementation has been developed that provides non-blocking and linearizable access to the concurrent shared object. In an application of the underlying techniques to a deque, the array-based algorithm allows uninterrupted concurrent access to both ends of the deque, while returning appropriate exceptions in the boundary cases when the deque is empty or full. An interesting characteristic of the concurrent deque implementation is that a processor can detect these boundary cases, e.g., determine whether the array is empty or full, without checking the relative locations of the two end pointers in an atomic operation.

BRIEF DESCRIPTION OF THE DRAWINGS

The present invention may be better understood, and its numerous objects, features, and advantages made apparent to those skilled in the art by referencing the accompanying drawings.

FIGS. 5A, 5B and 5C also illustrate an artifact of the linear depiction of a circular buffer, namely that, through a series of preceding operations, ends of the deque may wrap around such that left and right indices may appear (in the linear depiction) to the right and left of each other.

The use of the same reference symbols in different drawings indicates similar or identical items.

DESCRIPTION OF THE PREFERRED EMBODIMENT(S)

The description that follows presents a set of techniques, objects, functional sequences and data structures associated with concurrent shared object implementations employing double compare-and-swap (DCAS) operations in accordance with an exemplary embodiment of the present invention. An exemplary non-blocking, linearizable concurrent double-ended queue (deque) implementation is illustrative. A deque is a good exemplary concurrent shared object implementation, in that it involves all the intricacies of LIFO-stacks and FIFO-queues, with the added complexity of handling operations originating at both of the deque's ends. Accordingly, techniques, objects, functional sequences and data structures presented in the context of a concurrent deque implementation will be understood by persons of ordinary skill in the art to describe a superset of support and functionality suitable for less challenging concurrent shared object implementations, such as LIFO-stacks, FIFO-queues or concurrent shared objects (including deques) with simplified access semantics.

In view of the above, and without limitation, the description that follows focuses on an exemplary linearizable, non-blocking concurrent deque implementation which behaves as if access operations on. the deque are executed in a mutually exclusive manner, despite the absence of a mutual exclusion mechanism. Advantageously, and unlike prior approaches, deque implementations in accordance with some embodiments of the present invention allow concurrent operations on the two ends of the deque to proceed independently.

Computational Model

One realization of the present invention is as a deque implementation, employing the DCAS operation, on a shared memory multiprocessor computer. This realization, as well as others, will be understood in the context of the following computation model, which specifies the concurrent semantics of the deque data structure.

In general, a concurrent system consists of a collection of n processors. Processors communicate through shared data structures called objects. Each object has an associated set of primitive operations that provide the mechanism for manipulating that object. Each processor P can be viewed in an abstract sense as a sequential thread of control that applies a sequence of operations to objects by issuing an invocation and receiving the associated response. A history is a sequence of invocations and responses of some system execution. Each history induces a "real-time" order of operations where an operation A precedes another operation B, if A's response occurs before B's invocation. Two operations are concurrent if they are unrelated by the real-time order. A sequential history is a history in which each invocation is followed immediately by its corresponding response. The sequential specification of an object is the set of legal sequential histories associated with it. The basic correctness requirement for a concurrent implementation is linearizability. Every concurrent history is "equivalent" to some legal sequential history which is consistent with the real-time order induced by the concurrent history. In a linearizable implementation, an operation appears to take effect atomically at some point between its invocation and response. In the model described herein, a shared memory location L of a multiprocessor computer's memory is a linearizable implementation of an object that provides each processor $P_i$ with the following set of sequentially specified machine operations:

Read$_i$ (L) reads location L and returns its value.

Write$_i$ (L,v) writes the value v to location L.

DCAS$_i$ (L1, L2, o1, o2, n1, n2) is a double compare-and-swap operation with the semantics described below.

Implementations described herein are non-blocking (also called lock-free). Let us use the term higher-level operations in referring to operations of the data type being implemented, and lower-level operations in referring to the (machine) operations in terms of which it is implemented. A non-blocking implementation is one in which even though individual higher-level operations may be delayed, the system as a whole continuously makes progress. More formally, a non-blocking implementation is one in which any history containing a higher-level operation that has an invocation but no response must also contain infinitely many responses concurrent with that operation. In other words, if some processor performing a higher-level operation continuously takes steps and does not complete, it must be because some operations invoked by other processors are continuously completing their responses. This definition guarantees that the system as a whole makes progress and that individual processors cannot be blocked, only delayed by other processors continuously taking steps. Using locks would violate the above condition, hence the alternate name: lock-free.

Double-Word Compare-and-Swap Operation

Double-word compare-and-swap (DCAS) operations are well known in the art and have been implemented in hardware, such as in the Motorola 68040 processor, as well as through software emulation. Accordingly, a variety of suitable implementations exist and the descriptive code that follows is meant to facilitate later description of concurrent shared object implementations in accordance with the present invention and not to limit the set of suitable DCAS implementations. For example, order of operations is merely illustrative and any implementation with substantially equivalent semantics is also suitable. Furthermore, although exemplary code that follows includes overloaded variants of the DCAS operation and facilitates efficient implementations of the later described push and pop operations, other implementations, including single variant implementations may also be suitable.

```
boolean DCAS(val *addr1, val *addr2,
   val old1, val old2,
   val new1, val new2) {
   atomically {
   if ((*addr1==old1) && (*addr2==old2)) {
      *addr1 = new1;
      *addr2 = new2;
      return true;
   } else {
      return false;
   }
   }
} boolean DCAS(val *addr1, val *addr2,
   val old1, val old2,
   val *new1, val *new2) {
   atomically {
   temp1 = *addr1;
   temp2 = *addr2;
   if ((temp1 == old1) && (temp2 == old2)) {
```

```
    *addr1 = *new1;
    *addr2 = *new2;
    *new1 = temp1;
    *new2 = temp2;
    return true;
} else {
    *new1 = temp1;
    *new2 = temp2;
    return false;
}
}

}
```

Note that in the exemplary code, the DCAS operation is overloaded, i.e., if the last two arguments of the DCAS operation (new1 and new2) are pointers, then the second execution sequence (above) is operative and the original contents of the tested locations are stored into the locations identified by the pointers. In this way, certain invocations of the DCAS operation may return more information than a success/failure flag.

The above sequences of operations implementing the DCAS operation are executed atomically using support suitable to the particular realization. For example, in various realizations, through hardware support (e.g., as implemented by the Motorola 68040 microprocessor or as described in M. Herlihy and J. Moss, *Transactional memory: Architectural Support For Lock-Free Data Structures*, Technical Report CRL 92/07, Digital Equipment Corporation, Cambridge Research Lab, 1992, 12 pages), through non-blocking software emulation (such as described in G. Barnes, *A Method For Implementing Lock-Free Shared Data Structures*, in *Proceedings of the 5th ACM Symposium on Parallel Algorithms and Architectures*, pages 261-270, June 1993 or in N. Shavit and D. Touitou, *Software transactional memory, Distributed Computing*, 10(2):99-116, February 1997), or via a blocking software emulation (such as described in U.S. Pat. No. 6,223,335, entitled "PLATFORM INDEPENDENT DOUBLE COMPARE AND SWAP OPERATION," naming Cartwright and Agesen as inventors, and filed Dec. 9, 1998).

Although the above-referenced implementations are presently preferred, other DCAS implementations that substantially preserve the semantics of the descriptive code (above) are also suitable. Furthermore, although much of the description herein is focused on double-word compare-and-swap (DCAS) operations, it will be understood that N-location compare-and-swap operations ($N \geq 2$) may be more generally employed, though often at some increased overhead.

A Double-Ended Queue (Deque)

A deque object S is a concurrent shared object, that in an exemplary realization is created by an operation of a constructor operation, e.g., make_deque (length_s), and which allows each processor $P_i$, $0 \leq i \leq n-1$, of a concurrent system to perform the following types of operations on S: push_right$_i$ (v),push_left$_i$(v),pop_right$_i$( ), and pop_left$_i$( ). Each push operation has an input, v, where v is selected from a range of values. Each pop operation returns an output from the range of values. Push operations on a full deque object and pop operations on an empty deque object return appropriate indications.

A concurrent implementation of a deque object is one that is linearizable to a standard sequential deque. This sequential deque can be specified using a state-machine representation that captures all of its allowable sequential histories. These sequential histories include all sequences of push and pop operations induced by the state machine representation, but do not include the actual states of the machine. In the following description, we abuse notation slightly for the sake of clarity.

The state of a deque is a sequence of items $S=<v_0, \ldots, v_k>$ from the range of values, having cardinality $0 \leq |S| \leq length\_S$. The deque is initially in the empty state (following invocation of make_deque (length_S)), that is, has cardinality 0, and is said to have reached a full state if its cardinality is length_S.

The four possible push and pop operations, executed sequentially, induce the following state transitions of the sequence $S=<v_0, \ldots, v_k>$, with appropriate returned values:

push_right($v_{new}$) if S is not full, sets S to be the sequence $S=<v_0, \ldots, v_k, v_{new}>$ push_left($v_{new}$) if S is not full, sets S to be the sequence $S=<v_{new}, v_0, \ldots, v_k>$ pop right ( ) if S is not empty, sets S to be the sequence $S=<v_0, \ldots, v_{k-1}>$ pop_left ( ) if S is not empty, sets S to be the sequence $S=<v_1, \ldots, v_k>$ For example, starting with an empty deque state, $S=< >$, the following sequence of operations and corresponding transitions can occur. A push_right (1) changes the deque state to $S=<1>$. A push_left (2) subsequently changes the deque state to $S=<2,1>$. A subsequent push_right (3) changes the deque state to $S=<2,1,3>$. Finally, a subsequent pop_right( ) changes the deque state to $S=<2,1>$.

An Array-Based Implementation

The description that follows presents an exemplary non-blocking implementation of a deque based on an underlying contiguous array data structure wherein access operations (illustratively, push_left, pop_left, push_right and pop_right) employ DCAS operations to facilitate concurrent access. Exemplary code and illustrative drawings will provide persons of ordinary skill in the art with detailed understanding of one particular realization of the present invention; however, as will be apparent from the description herein and the breadth of the claims that follow, the invention is not limited thereto. Exemplary right-hand-side code is described in substantial detail with the understanding that left-hand-side operations are symmetric. Use herein of directional signals (e.g., left and right) will be understood by persons of ordinary skill in the art to be somewhat arbitrary. Accordingly, many other notational conventions, such as top and bottom, first-end and second-end, etc., and implementations denominated therein are also suitable.

Figure 1A:
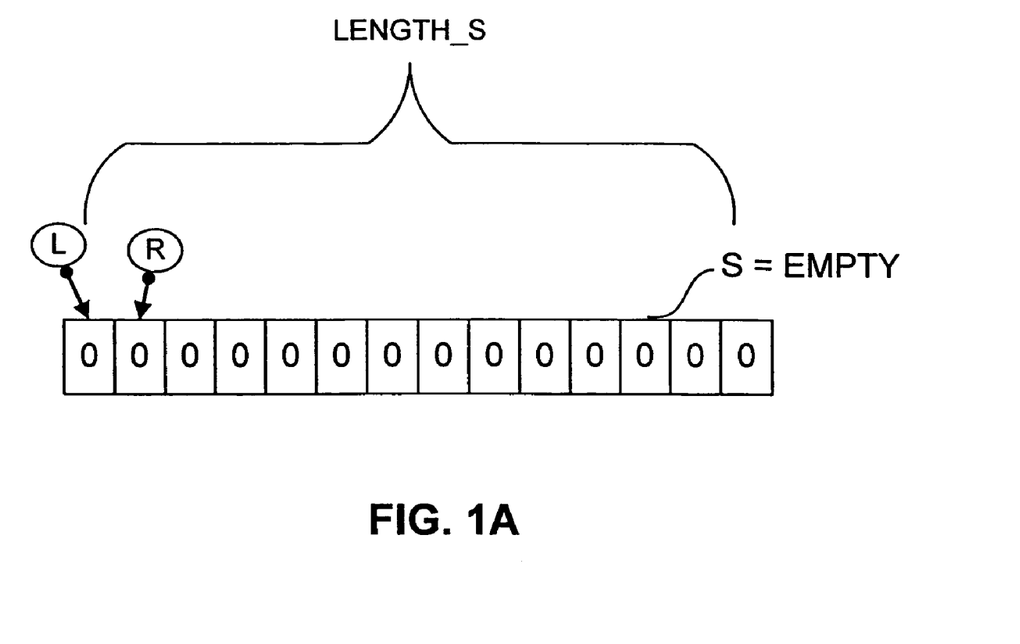
FIGS. 1A and 1B illustrate exemplary empty and full states of a double-ended queue (deque) implemented as an array in accordance with the present invention.
Figure 1B:
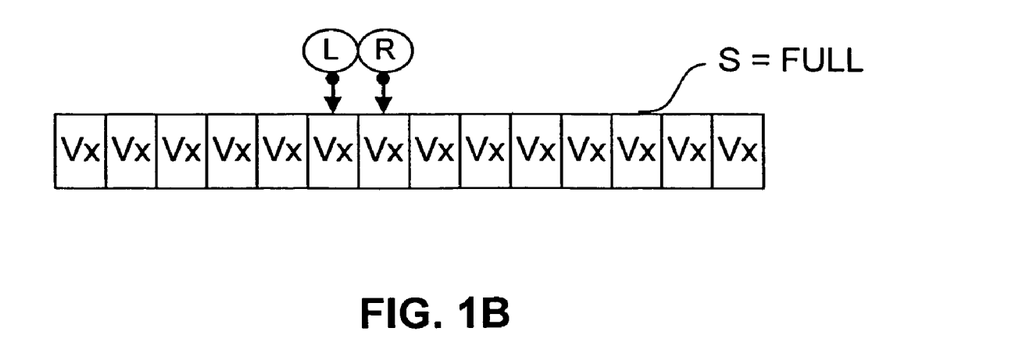

With the foregoing in mind, an exemplary non-blocking implementation of a deque based on an underlying contiguous array data structure is illustrated with reference to FIGS. 1A and 1B. In general, an array-based deque implementation includes a contiguous array S [0 . . . length_S-1] of storage locations indexed by two counters, R and L. The array, as well as the counters (or alternatively, pointers or indices), are typically stored in memory. Typically, the array S and indices R and L are stored in a same memory, although more generally, all that is required is that a particular DCAS implementation span the particular storage locations of the array and an index.

In operations on S, we assume that mod is the modulus operation over the integers (e.g., −1 mod 6=5, −2 mod 6=4, and so on). Henceforth, in the description that follows, we assume that all values of R and L are modulo length_S, which implies that the array S is viewed as being circular. The array S [0 . . . length_S−1] can be viewed as if it were laid out with indexes increasing from left to right. We assume a distinguishing value, e.g., "null" (denoted as 0 in the drawings), not occurring in the range of real data values for S. Of course, other distinguishing values are also suitable.

Operations on S proceed as follows. Initially, for empty deque state, L points immediately to the left of R. In the illustrative embodiment, indices L and R always point to the next location into which a value can be inserted. If there is a null value stored in the element of S immediately to the right of that identified by L (or respectively, in the element of S immediately to the left of that identified by R), then the deque is in the empty state. Similarly, if there is a non-null value in the element of identified by L (respectively, in the element of S identified by R), then the deque is in the full state. FIG. 1A depicts an empty state and FIG. 1B depicts a full state. During the execution of access operations in accordance with the present invention, the use of a DCAS guarantees that on any location in the array, at most one processor can succeed in modifying the entry at that location from a "null" to a "non-null" value or vice versa.

An illustrative pop_right access operation in accordance with the present invention follows:

```
1      val pop_right {
2         while (true) {
3            oldR = R;
4            newR = (oldR – 1) mod length_S;
5            oldS = S[newR];
6            if (oldS == "null") {
7               if (oldR == R)
8                  if (DCAS(&R, &S[newR],
9                          oldR, oldS, oldR, oldS))
10                     return "empty";
11           }
12           else {
13              newS = "null";
14              if (DCAS(&R, &S[newR],
15                      oldR, oldS, &newR, &newS))
16                 return newS;
17              else if (newR == oldR) {
18                 if (newS == "null") return "empty";
19              }
20           }
21        }
22     }
```

To perform a pop_right, a processor first reads R and the location in S corresponding to R−1 (Lines 3-5, above). It then checks whether S [R−1] is null. As notedabove, S[R−1] is shorthand for S[R−1 mod length_S]. If S[R−1] is null, then the processor reads R again to see if it has changed (Lines 6-7). This additional read is a performance enhancement added under the assumption that the common case is that a null value is read because another processor "stole" the item, and not because the queue is really empty. Other implementations need not employ such an enhancement. The test can be stated as follows: if R hasn't changed and S[R−1] is null, then the deque must be empty since the location to the left of R always contains a value unless there are no items in the deque. However, the conclusion that the deque is empty can only be made based on an instantaneous view of R and S [R−1]. Therefore, the pop_right implementation employs a DCAS (Lines 8-10) to check if this is in fact the case. If so, pop_right returns an indication that the deque is empty. If not, then either the value in S [R−1] is no longer null or the index R has changed. In either case, the processor loops around and starts again, since there might now be an item to pop.

If s [R−1] is not null, the processor attempts to pop that item (Lines 12-20). The pop_right implementation employs a DCAS to try to atomically decrement the counter R and place a null value in S [R−1], while returning (via &newR and &newS) the old value in S [R−1] and the old value of the counter R (Lines 13-15). Note that the overloaded variant of DCAS described above is utilized here.

Figure 2:
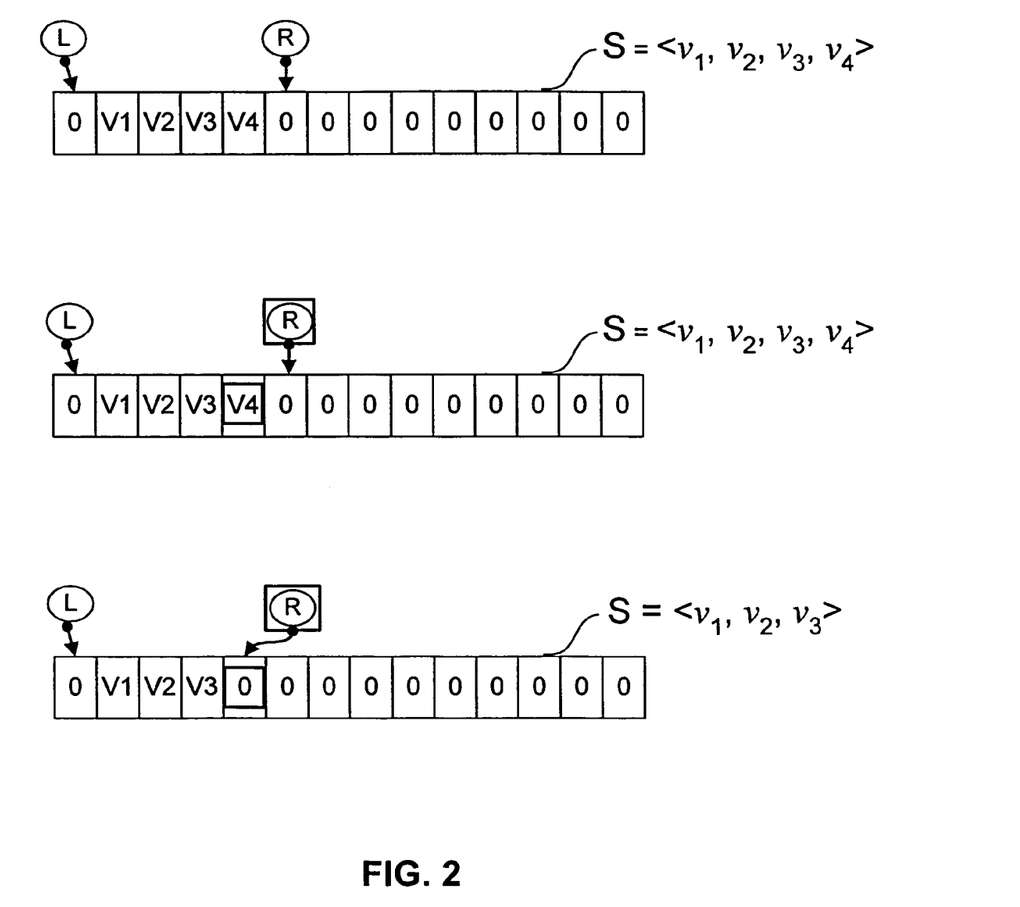
FIG. 2 illustrates successful operation of a pop_right operation on a partially full state of a deque implemented as an array in accordance with the present invention.

A successful DCAS (and hence a successful pop_right operation) is depicted in FIG. 2. Initially, $S=<v_1, v_2, v_3, v_4>$ and L and R are as shown. Contents of R and of S [R−1] are read, but the results of the reads may not be consistent if an intervening competing access has successfully completed. In the context of the deque state illustrated in FIG. 2, the competing accesses of concern are a pop_right or a push_right, although in the case of an almost empty state of the deque, a pop_left might also intervene. Because of the risk of a successfully completed competing access, the pop_right implementation employs a DCAS (lines 14-15) to check the instantaneous values of R and of S [R−1] and, if unchanged, perform the atomic update of R and of S [R−1] resulting in a deque state of $S=<v_1, v_2, v_3>$.

Figure 4:
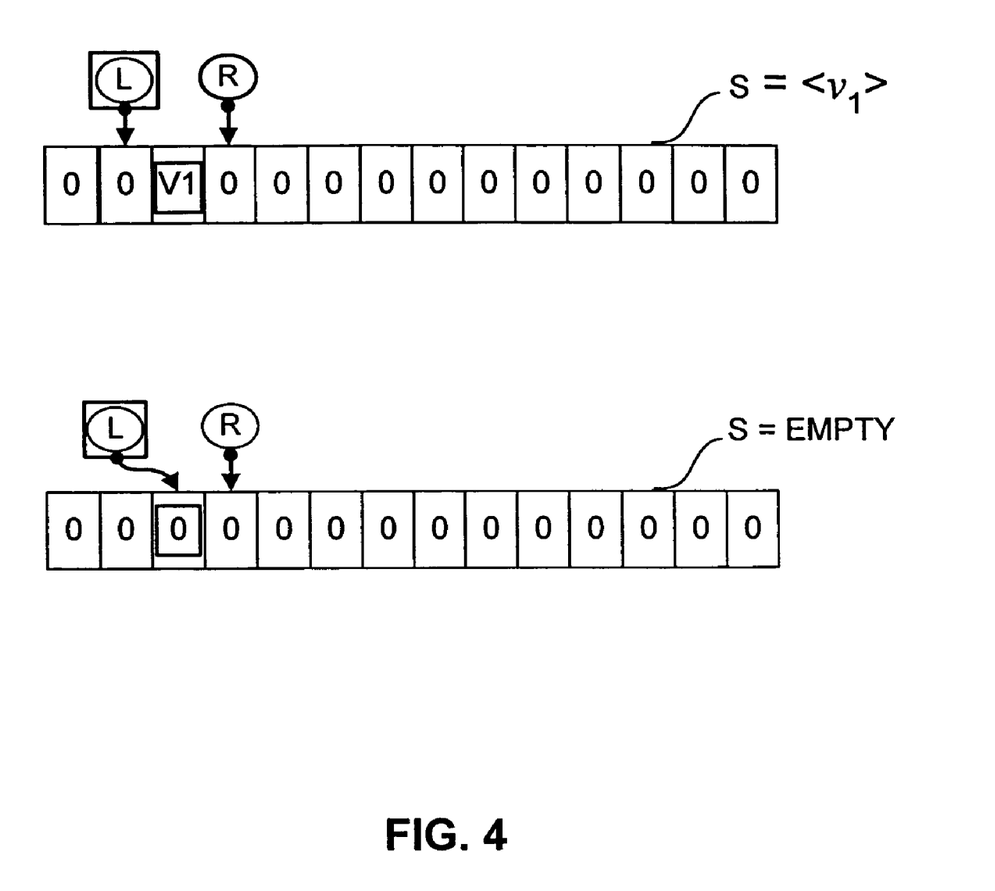
FIG. 4 illustrates contention between opposing pop_left and pop_right operations for a single remaining element in an almost empty state of a deque implemented as an array in accordance with the present invention.

If the DCAS is successful (as indicated in FIG. 2), the pop_right returns the value $v_4$ from S [R−1]. If it fails, pop_right checks the reason for the failure. If the reason for the DCAS failure was that R changed, then the processor retries (by repeating the loop) since there may be items still left in the deque. If R has not changed (Line 17), then the DCAS must have failed because s [R−1] changed. If it changed to null (Line 18), then the deque is empty. An empty deque may be the result of a competing pop_left that "steals" the last item from the pop_right, as illustrated in FIG. 4.

If, on the other hand, S [R−1] was not null, the DCAS failure indicates that the value of S [R−1] has changed, and some other processor(s) must have completed a pop and a push between the read and the DCAS operation. In this case, pop_right loops back and retries, since there may still be items in the deque. Note that Lines 17-18 are an optimization, and one can instead loop back if the DCAS fails. The optimization allows detection of a possible empty state without going through the loop, which in case the queue was indeed empty, would require another DCAS operation (Lines 6-10).

To perform a push_right, a sequence similar to pop_right is performed. An illustrative push_right access operation in accordance with the present invention follows:

```
1      val push_right (val v) {
2         while (true) {
3            oldR = R;
4            newR = (oldR + 1) mod length_S;
5            oldS = S[oldR];
6            if (oldS != "null") {
7               if (oldR == R)
8                  if (DCAS(&R, &S[oldR],
9                          oldR, oldS, oldR, oldS))
10                     return "full";
11           }
12           else {
13              newS = v;
14              if DCAS(&R, &S[oldR],
15                     oldR, oldS, &newR, &newS)
16                 return "okay";
17              else if (newR == oldR)
18                 return "full";
19           }
20        }
21     }
```

Operation of pop_right is similar to that of push_right, but with all tests to see if a location is null replaced with tests to see if it is non-null, and with S locations corresponding to an index identified by, rather than adjacent to that identified by, the index. To perform a push_right, a processor first reads R and the location in S corresponding to R (Lines 3-5, above). It then checks whether S [R] is non-null. If S [R] is non-null, then the processor reads R again to see if it has changed (Lines 6-7). This additional read is a performance enhancement added under the assumption that the common case is that a non-null value is read because another processor "beat" the processor, and not because the queue is really full. Other implementations need not employ such an enhancement. The test can be stated as follows: if R hasn't changed and S [R] is non-null, then the deque must be full since the location identified by R always contains a null value unless the deque is full. However, the conclusion that the deque is full can only be made based on an instantaneous view of R and S [R]. Therefore, the push_right implementation employs a DCAS (Lines 8-10) to check if this is in fact the case. If so, push_right returns an indication that the deque is full. If not, then either the value in S [R] is no longer non-null or the index R has changed. In either case, the processor loops around and starts again.

If S [R] is null, the processor attempts to push value, v, onto s (Lines 12-19). The push_right implementation employs a DCAS to try to atomically increment the counter R and place the value, v, in S [R], while returning (via &newR) the old value of index R (Lines 14-16). Note that the overloaded variant of DCAS described above is utilized here.

Figure 3:
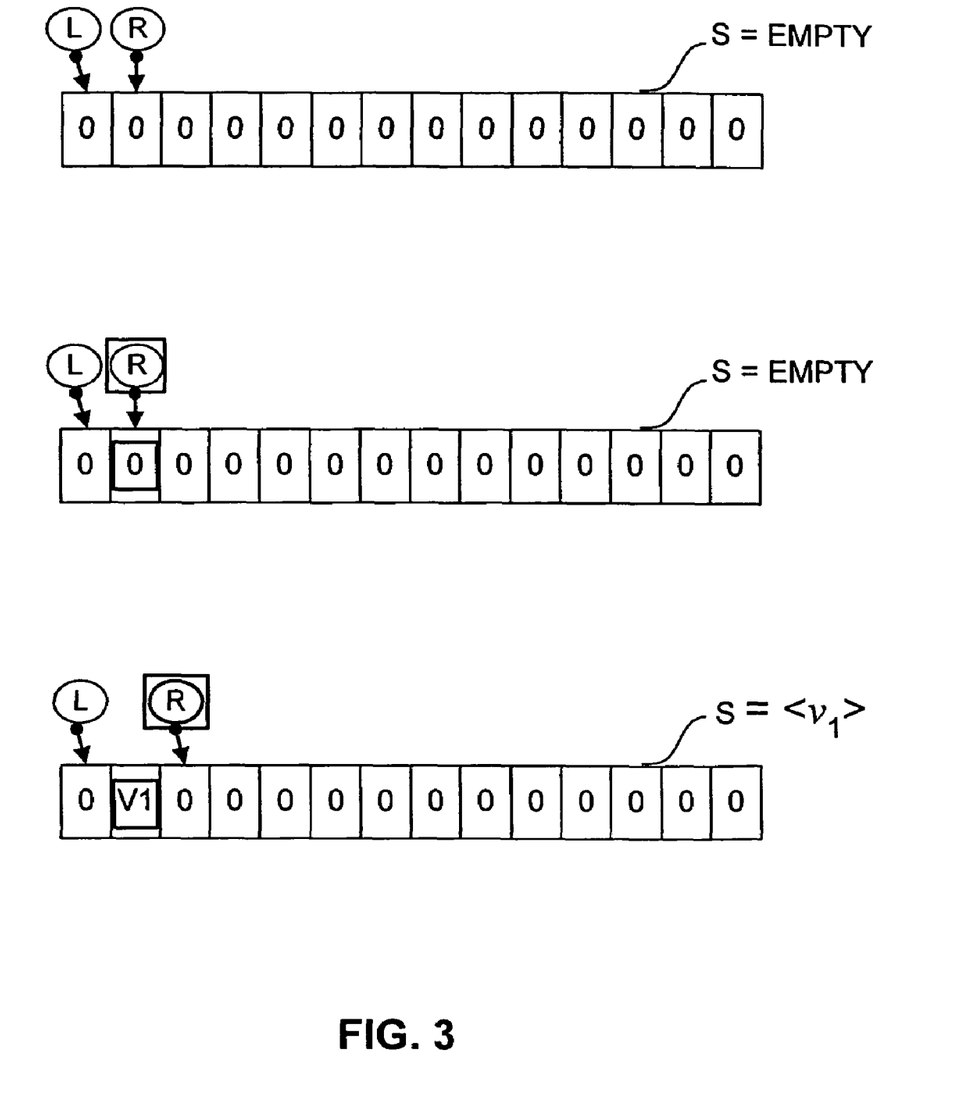
FIG. 3 illustrates successful operation of a push_right operation on a empty state of a deque implemented as an array in accordance with the present invention.

A successful DCAS and hence a successful push_right operation into an empty deque is depicted in FIG. 3. Initially, S=< > and L and R are as shown. Contents of R and of S [R] are read, but the results of the reads may not be consistent if an intervening competing access has successfully completed. In the context of the empty deque state illustrated in FIG. 3, the competing access of concern is another push_right, although in the case of non-empty state of the deque, a pop_right might also intervene. Because of the risk of a successfully completed competing access, the push_right implementation employs a DCAS (lines 14-15) to check the instantaneous values of R and of S [R] and, if unchanged, perform the atomic update of R and of S [R] resulting in a deque state of S=<$v_1$>. A successful push_right operation into an almost-full deque is illustrated in the transition from deque states of FIGS. 5B and 5C.

In the final stage of the push_right code, in case the DCAS failed, there is a check using the value returned (via &newR) to see if the R index has changed. If it has not, then the failure must be due to a non-null value in the corresponding element of S, which means that the deque is full.

Pop_left and push_left sequences correspond to their above described right hand variants. An illustrative pop_left access operation in accordance with the present invention follows:

```
1       val pop_left {
2         while (true) {
3           oldL = L;
4           newL = (oldL + 1) mod length_S;
5           oldS = S[newL];
6           if (oldS == "null") {
7             if (oldL == L)
8               if (DCAS(&L, &S[newL],
9                      oldL, oldS, oldL, oldS))
10                return "empty";
11          }
12          else {
13            newS = "null";
14            if (DCAS(&L, &S[newL],
15                   oldL, oldS, &newL, &newS))
16              return newS;
17            else if (newL == oldL) {
18              if (newS == "null") return "empty";
19            }
20          }
21        }
22      }
```

An illustrative push_left access operation in accordance with the present invention follows:

```
1       val push_left (val v) {
2         while (true) {
3           oldL = L;
4           newL = (oldL - 1) mod length_S;
5           oldS = S[oldL];
6           if (oldS != "null") {
7             if (oldL == L)
8               if (DCAS(&L, &S[oldL],
9                      oldL, oldS, oldL, oldS))
10                return "full" ;
11          }
12          else {
13            newS = v;
14            if (DCAS(&L, &S[oldL],
15                   oldL, oldS, &newL, &newS))
16              return "okay";
17            else if (newL == oldL)
18              return "full";
19          }
20        }
21      }
```

Figure 5A:
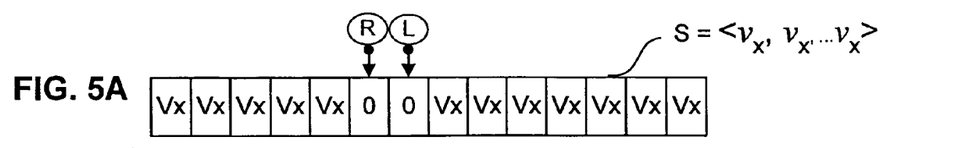
FIGS. 5A, 5B and 5C illustrate the results of a sequence of push_left and push_right operations on a nearly full state of a deque implemented as an array in accordance with the present invention. Following successful completion of the push_right operation, the deque is in a full state.
Figure 5B:
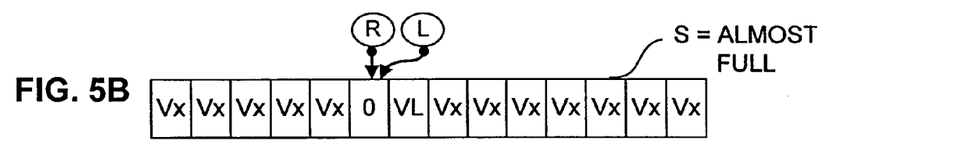
Figure 5C:
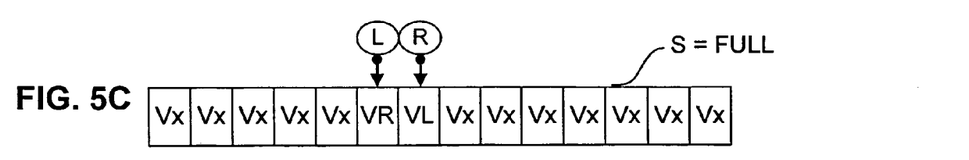

FIGS. 5A, 5B and 5C illustrate operations on a nearly full deque including a push_left operation (FIG. 5B) and a push_right operation that result in a full state of the deque (FIG. 5C). Notice that L has wrapped around and is "to-the-right" of R, until the deque becomes full, in which case again L and R cross. This switching of the relative location of the L and R pointers is somewhat confusing and represents a limitation of the linear presentation in the drawings. However, in any case, it should be noted that each of the above described access operations (push_left, pop_left, push_right and pop_right) can determine the state of the deque, without regard to the relative locations of L and R, but rather by examining the relation of a given index (R or L) to the value in a corresponding element of S.

While the invention has been described with reference to various embodiments, it will be understood that these embodiments are illustrative and that the scope of the invention is not limited to them. Many variations, modifications, additions, and improvements are possible. Plural instances may be provided for components described herein as a single instance. Finally, boundaries between various components, services, servlets, and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A computer implemented method performed on a processor, the computer implemented method comprising:

obtaining a circular array comprising a first data item stored in a first location, a second data item stored in a second location immediately following the first location, and a third data item stored in a third location immediately following the second location;

obtaining a front counter indexing a front location immediately following the third location and a back counter indexing a back location immediately before the first location;

executing a first pop back instruction using a first double compare and swap (DCAS) operation to remove the first data item from the circular array, place a null value in the first location, and change the back counter to index the first location;

executing a first pop front instruction using a second DCAS operation to remove the third data item from the circular array, place the null value in the third location of the circular array, and change the front counter to index the third location; and executing a second pop front instruction without reading the back counter after executing the first pop back instruction and the first pop front instruction.

2. The computer implemented method of claim 1, further comprising:

storing at least one selected from a group consisting of the first data item and the second data item after executing the first pop back instruction and the first pop front instruction.

3. The computer implemented method of claim 1, wherein executing the second pop front instruction comprises:

determining a first counter value by reading the front counter;

calculating a second counter value based on the first counter value; and determining a first array value by reading the circular array at the second counter value.

4. The computer implemented method of claim 3, wherein executing the second pop front instruction further comprises:

comparing the first counter value with the front counter to generate a first comparison; and comparing the first array value with a second array value determined by reading the circular array at the second counter value to generate a second comparison, wherein the first array value equals the second array value and the first counter value equals the second counter value, wherein the first comparison and the second comparison belong to a third DCAS operation executed after determining the first array value, and wherein the third DCAS operation removes the second data item from the circular array and sets the front counter to index the second location based on the first comparison and the second comparison.

5. The computer implemented method of claim 4, wherein the first counter value equals the front counter.

6. The computer implemented method of claim 3, further comprising:

executing a second pop back instruction after determining the first array value to remove the second data item from the circular array, place the null value in the second location of the circular array, and change the back counter to index the second location;

comparing the first counter value with the front counter to generate a first comparison; and comparing the first array value with a second array value determined by reading the circular array at the second counter value to generate a second comparison, wherein the first comparison and the second comparison belong to a third DCAS operation executed after executing the second pop back instruction, and wherein the third DCAS indicates the circular array is empty based on the first comparison and the second comparison.

7. The computer implemented method of claim 6, wherein the second array value is null and the first counter value equals the front counter.

8. The computer implemented method of claim 6, wherein the second pop front instruction is issued by a first thread and the second pop back instruction is issued by a second thread.

9. The computer implemented method of claim 3, further comprising:

executing a push front instruction after determining the first array value to add a fourth data item to the third position and change the front counter to index the front location;

comparing the first counter value with the front counter to generate a first comparison;

comparing the first array value with a second array value determined by reading the circular array at the second counter value to generate a second comparison, wherein the first comparison and the second comparison belong to a third DCAS operation executed after executing the push front instruction; and returning the fourth data item from the circular array and setting the front counter to index the third location using a fourth DCAS after executing the third DCAS.

10. The computer implemented method of claim 9, wherein an absolute difference between the first counter value and the front counter exceeds zero.

11. The computer implemented method of claim 9, wherein the push front instruction is issued by a first thread and the second pop front instruction is issued by a second thread.

12. The computer implemented method of claim 3, wherein the second counter value equals the first counter value minus one modulo a size of the circular array.

13. The computer implemented method of claim 3, wherein the second counter value equals the first counter value plus one modulo a size of the circular array.

14. The computer implemented method of claim 1, wherein the second pop front instruction is issued by a first thread and the second pop back instruction is issued by a second thread.

15. The computer implemented method of claim 1, wherein the second pop front instruction is issued by a first processor and the second pop back instruction is issued by a first thread.

16. A computer implemented method performed on a processor, the computer implemented method comprising:

obtaining a circular array comprising a plurality of data items, wherein each of the plurality of data items is stored in one of a plurality of consecutive locations in the circular array, wherein a size of the circular array exceeds a cardinality of the plurality of data items by at least three locations;

obtaining a front counter indexing a front location of the circular array immediately following the plurality of consecutive locations and a back counter indexing a back location of the circular array immediately before plurality of consecutive locations;

executing a first push back instruction using a first double compare and swap (DCAS) operation to insert a first data item into the back location and change the back counter to index an adjacent location immediately before the back location;

executing a first push front instruction using a second DCAS operation to insert a second data item into the front location and change the front counter to index the adjacent location; and executing a second push front instruction without reading the back counter after executing the first push back instruction and the first push front instruction.

17. The computer implemented method of claim 16, further comprising:
storing at least one selected from a group consisting of the first data item and the second data item after executing the first push back instruction and the first push front instruction.

18. The computer implemented method of claim 16, wherein executing the second push front instruction comprises:
determining a first counter value by reading the front counter;
calculating a second counter value based on the first counter value; and
determining a first array value by reading the circular array at the first counter value.

19. The computer implemented method of claim 18, wherein executing the second push front instruction further comprises:
comparing the first counter value with the front counter to generate a first comparison; and
comparing the first array value with a second array value determined by reading the circular array at the first counter value to generate a second comparison,
wherein the first array value equals the second array value and the first counter value equals the second counter value,
wherein the first comparison and the second comparison belong to a third DCAS operation executed after determining the first array value, and
wherein the third DCAS operation inserts a third data item into the adjacent location and sets the front counter to the second counter value based on the first comparison and the second comparison.

20. The computer implemented method of claim 19, wherein the first array value is null and the first counter value equals the front counter.

21. The computer implemented method of claim 18, further comprising:
executing a second push back instruction after determining the first array value to insert a fourth data item into the adjacent location and change the back counter to index the front location;
comparing the first counter value with the front counter to generate a first comparison; and
comparing the first array value with a second array value determined by reading the circular array at the first counter value to generate a second comparison,
wherein the first comparison and the second comparison belong to a third DCAS operation executed after executing the second push back instruction, and
wherein the third DCAS indicates the circular array is full based on the first comparison and the second comparison.

22. The computer implemented method of claim 21, wherein the first counter value equals the front counter.

23. The computer implemented method of claim 21, wherein the second push back instruction is issued by a first thread and the second push front instruction is issued by a second thread.

24. The computer implemented method of claim 18, further comprising:
executing a pop front instruction after determining the first array value to remove the second data item and change the front counter to index the front location;
comparing the first counter value with the front counter to generate a first comparison;
comparing the first array value with a second array value determined by reading the circular array at the first counter value to generate a second comparison,
wherein the first comparison and the second comparison belong to a third DCAS operation executed after executing the pop front instruction; and
inserting a third data item into the front location and setting the front counter to index the adjacent location using a fourth DCAS after executing the third DCAS.

25. The computer implemented method of claim 24, wherein an absolute difference between the first counter value and the front counter exceeds zero.

26. The computer implemented method of claim 24, wherein the pop front instruction is issued by a first thread and the second push front instruction is issued by a second thread.

27. The computer implemented method of claim 18, wherein the second counter value equals the first counter minus one modulo a size of the circular array.

28. The computer implemented method of claim 18, wherein the second counter value equals the first counter value plus one modulo a size of the circular array.

29. The computer implemented method of claim 16, wherein the first push front instruction is issued by a first thread and the second push front instruction is issued by a second thread.

30. An apparatus, comprising:
a processor; and
memory having instructions when executed by the processor the instructions comprises functionalities for:
obtaining a circular array comprising a first data item stored in a first location, a second data item stored in a second location immediately following the first location, and a third data item stored in a third location immediately following the second location;
obtaining a front counter indexing a front location immediately following the third location and a back counter indexing a back location immediately before the first location;
executing a first pop back instruction using a first double compare and swap (DCAS) operation to remove the first data item from the circular array, place a null value in the first location, and change the back counter to index the first location;
executing a first pop front instruction using a second DCAS operation to remove the third data item from the circular array, place the null value in the third location of the circular array, and change the front counter to index the third location; and
executing a second pop front instruction without reading the back counter after executing the first pop back instruction and the first pop front instruction.

31. The apparatus of claim 30, wherein the executing the second pop front instruction comprises:
determining a first counter value by reading the front counter;

calculating a second counter value based on the first counter value; and determining a first array value by reading the circular array at the second counter value.

32. The apparatus of claim 31, wherein the executing the second pop front instruction further comprises:

comparing the first counter value with the front counter to generate a first comparison; and comparing the first array value with a second array value determined by reading the circular array at the second counter value to generate a second comparison, wherein the first array value equals the second array value and the first counter value equals the second counter value, wherein the first comparison and the second comparison belong to a third DCAS operation executed after determining the first array value, and wherein the third DCAS operation removes the second data item from the circular array and sets the front counter to index the second location based on the first comparison and the second comparison.

33. The apparatus of claim 31, the instructions further comprising functionalities for:

executing a second pop back instruction after determining the first array value to remove the second data item from the circular array, place the null value in the second location of the circular array, and change the back counter to index the second location;

comparing the first counter value with the front counter to generate a first comparison; and comparing the first array value with a second array value determined by reading the circular array at the second counter value to generate a second comparison, wherein the first comparison and the second comparison belong to a third DCAS operation executed after executing the second pop back instruction, and wherein the third DCAS indicates the circular array is empty based on the first comparison and the second comparison.

34. The apparatus of claim 31, the instructions further comprising functionalities for:

comparing the first array value with a second array value determined by reading the circular array at the second counter value to generate a second comparison, wherein the first comparison and the second comparison belong to a third DCAS operation executed after executing the push front instruction; and returning the fourth data item from the circular array and setting the front counter to index the third location using a fourth DCAS after executing the third DCAS.

35. An apparatus comprising:

a processor; and memory having instructions when executed by the processor the instructions comprises functionalities for:

obtaining a circular array comprising a plurality of data items, wherein each of the plurality of data items is stored in one of a plurality of consecutive locations in the circular array, wherein a size of the circular array exceeds a cardinality of the plurality of data items by at least three locations;

obtaining a front counter indexing a front location of the circular array immediately following the plurality of consecutive locations and a back counter indexing a back location of the circular array immediately before plurality of consecutive locations;

executing a first push back instruction using a first double compare and swap (DCAS) operation to insert a first data item into the back location and change the back counter to index an adjacent location immediately before the back location;

executing a first push front instruction using a second DCAS operation to insert a second data item into the front location and change the front counter to index the adjacent location; and executing a second push front instruction without reading the back counter after executing the first push back instruction and the first push front instruction.

36. The apparatus of claim 35, wherein the executing the second push front instruction comprises:

determining a first counter value by reading the front counter;

calculating a second counter value based on the first counter value; and determining a first array value by reading the circular array at the first counter value.

37. The apparatus of claim 36, wherein the executing the second push front instruction further comprises:

comparing the first counter value with the front counter to generate a first comparison; and comparing the first array value with a second array value determined by reading the circular array at the first counter value to generate a second comparison, wherein the first array value equals the second array value and the first counter value equals the second counter value, wherein the first comparison and the second comparison belong to a third DCAS operation executed after determining the first array value, and wherein the third DCAS operation inserts a third data item into the adjacent location and sets the front counter to the second counter value based on the first comparison and the second comparison.

38. The apparatus of claim 36, the instructions further comprising functionalities for:

executing a second push back instruction after determining the first array value to insert a fourth data item into the adjacent location and change the back counter to index the front location;

comparing the first counter value with the front counter to generate a first comparison; and comparing the first array value with a second array value determined by reading the circular array at the first counter value to generate a second comparison, wherein the first comparison and the second comparison belong to a third DCAS operation executed after executing the second push back instruction, and wherein the third DCAS indicates the circular array is full based on the first comparison and the second comparison.

39. The apparatus of claim 36, the instructions further comprising functionalities for:

executing a pop front instruction after determining the first array value to remove the second data item and change the front counter to index the front location;

comparing the first counter value with the front counter to generate a first comparison;

comparing the first array value with a second array value determined by reading the circular array at the first counter value to generate a second comparison, wherein the first comparison and the second comparison belong to a third DCAS operation executed after executing the pop front instruction; and inserting a third data item into the front location and setting the front counter to index the adjacent location using a fourth DCAS after executing the third DCAS.

* * * * *